United States Defensive Publication [19] (H) [11] T970,003

Newton et al. [43] May 2, 1978

[54] SCANNER REPEATABILITY ERROR DETERMINING APPARATUS

[76] Inventors: John Edward Newton, 8 Llewellyn St., Portsmouth, Va. 23707; Mark Alan Simon, 901 Elmgrove Rd., Rochester, N.Y. 14650

[21] Appl. No.: 770,963

[22] Filed: Feb. 22, 1977

[51] Int. Cl.[2] ..... G01D 5/30

[52] U.S. Cl. ..... 250/230

[57] ABSTRACT

A scanner repeatability error determining apparatus for use with a line scanning apparatus which includes a galvanometer responsive to a complex signal having ramp signal and compensation signal components for driving a line scan mirror. The compensation signal is a function of variations in velocity of the line scan mirror from a desired velocity. The apparatus includes circuitry for defining a predetermined range for the compensation signal and when such compensation signal is outside of this range produces an indication that there is a repeatability error.

1 Claim, 3 Sheets Drawing,

17 Pages Specification

The file of this unexamined application may be inspected and copies thereof may be purchased (849 O.G. 1221, Apr. 9, 1968).

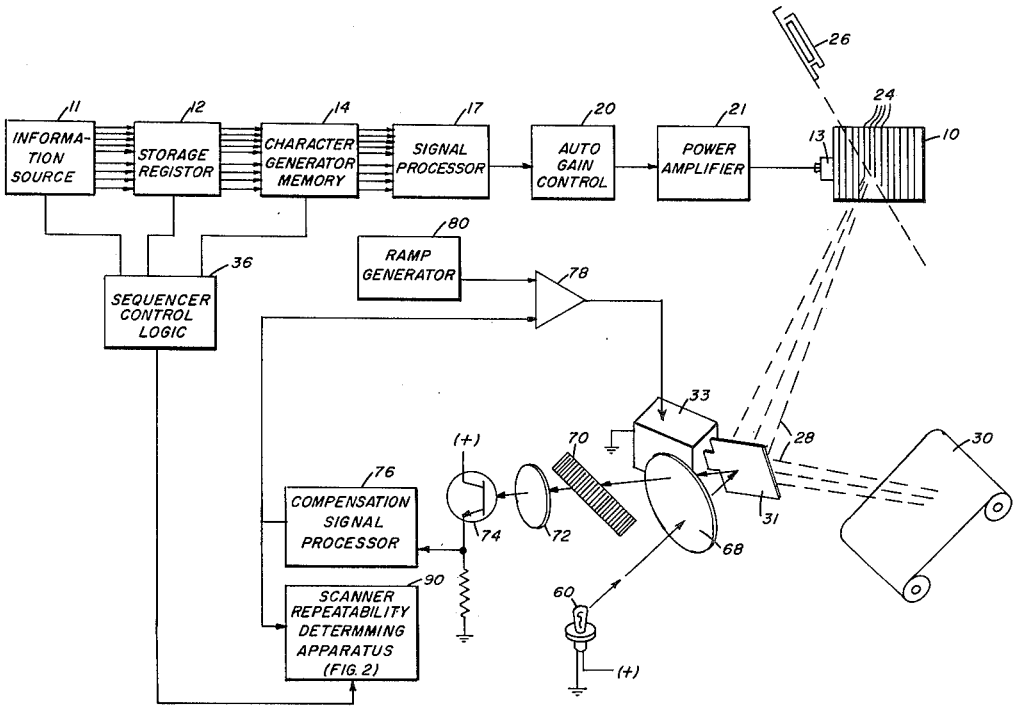

Figure 1:
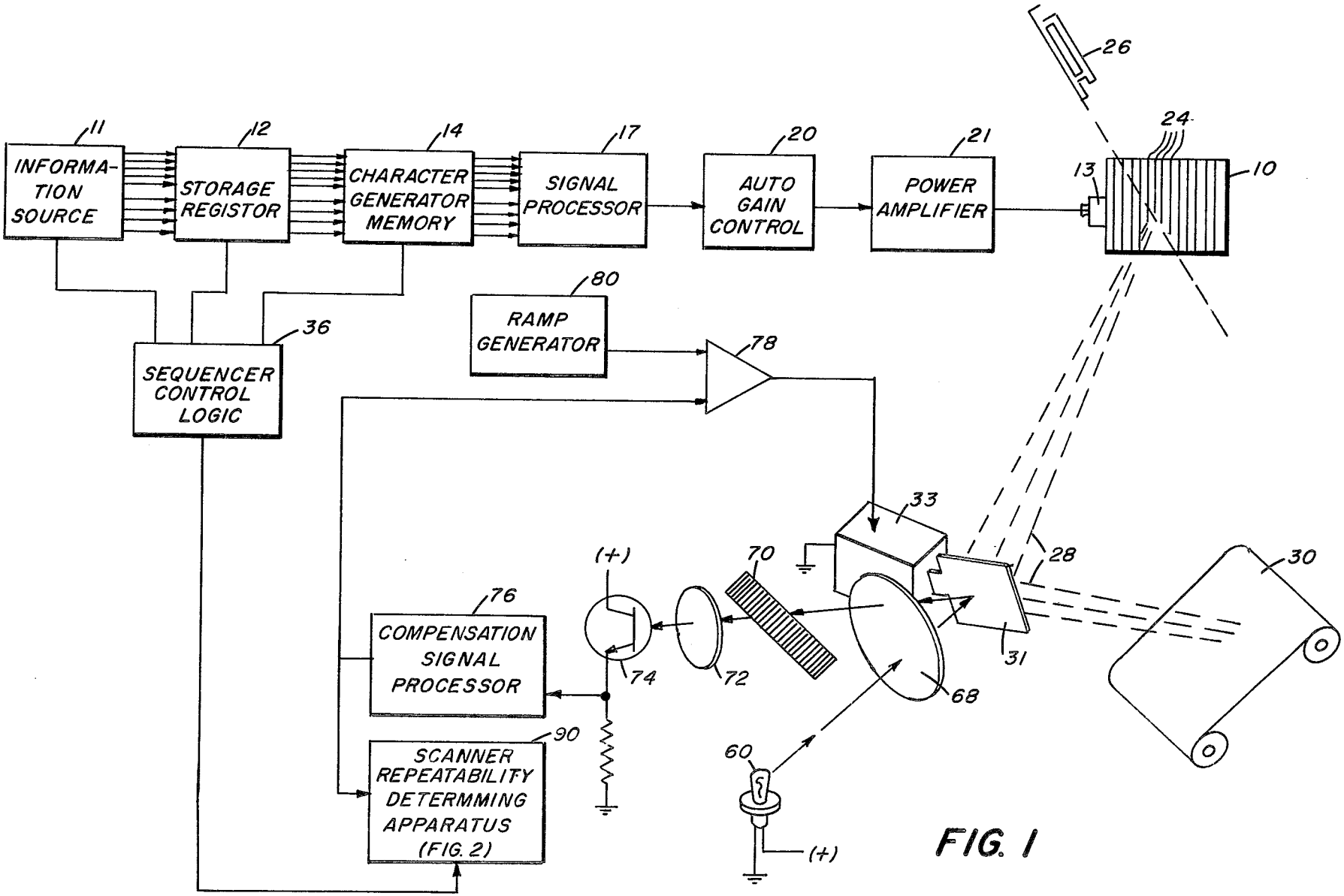
Figure 2:
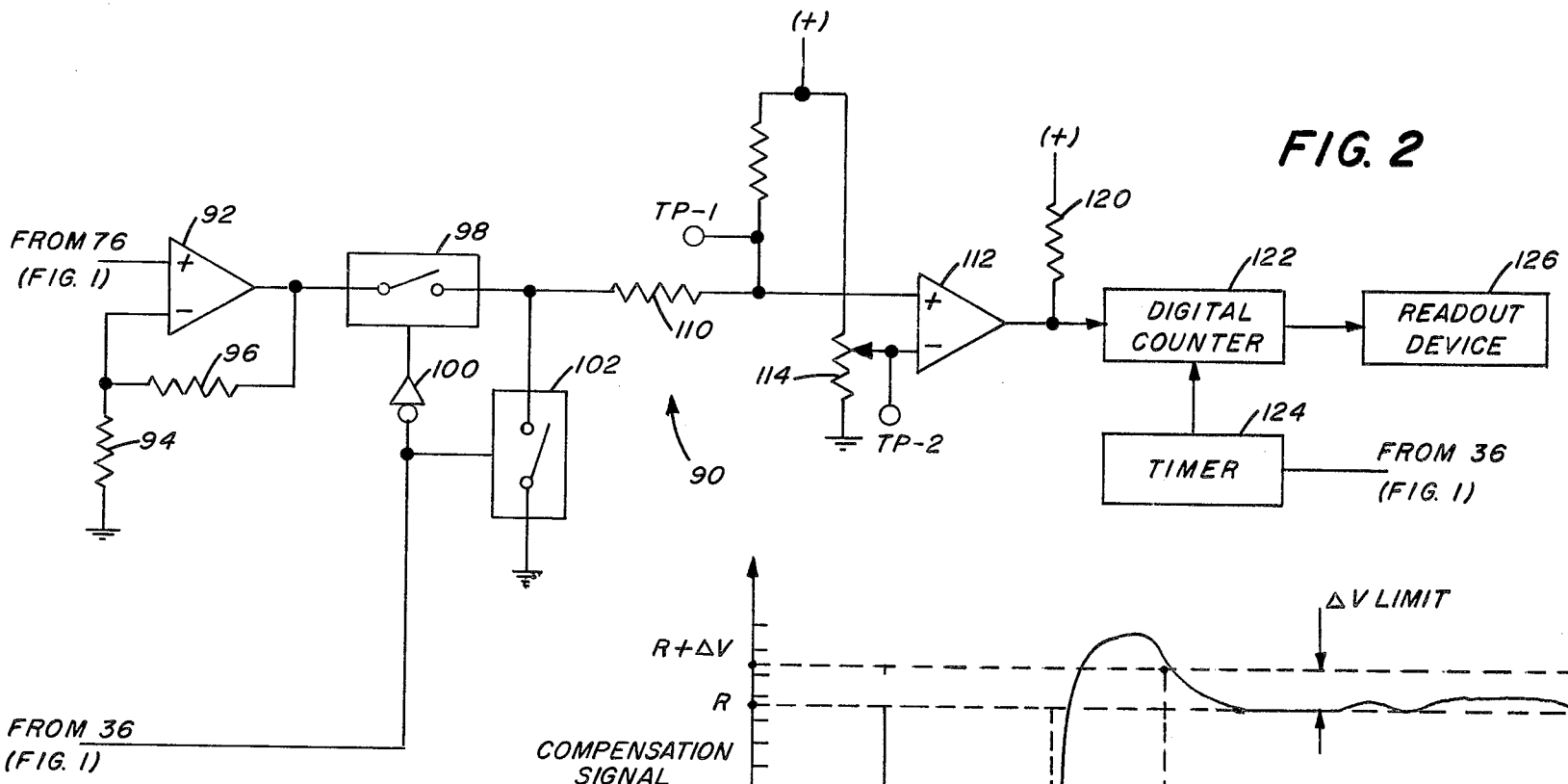
Figure 3:
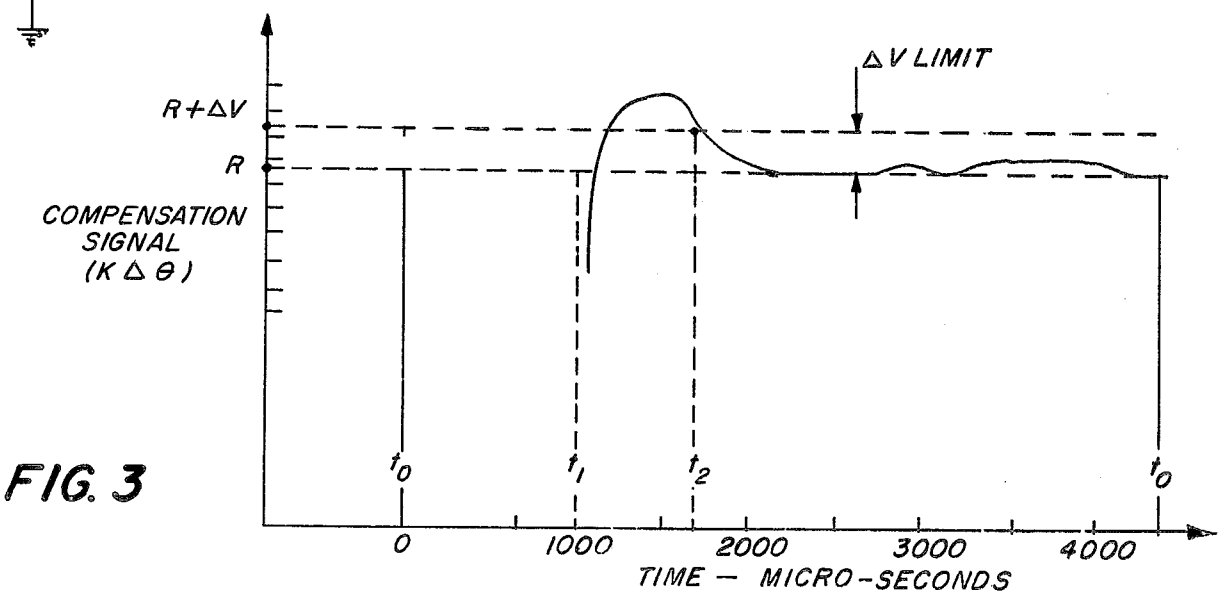
Figure 4:
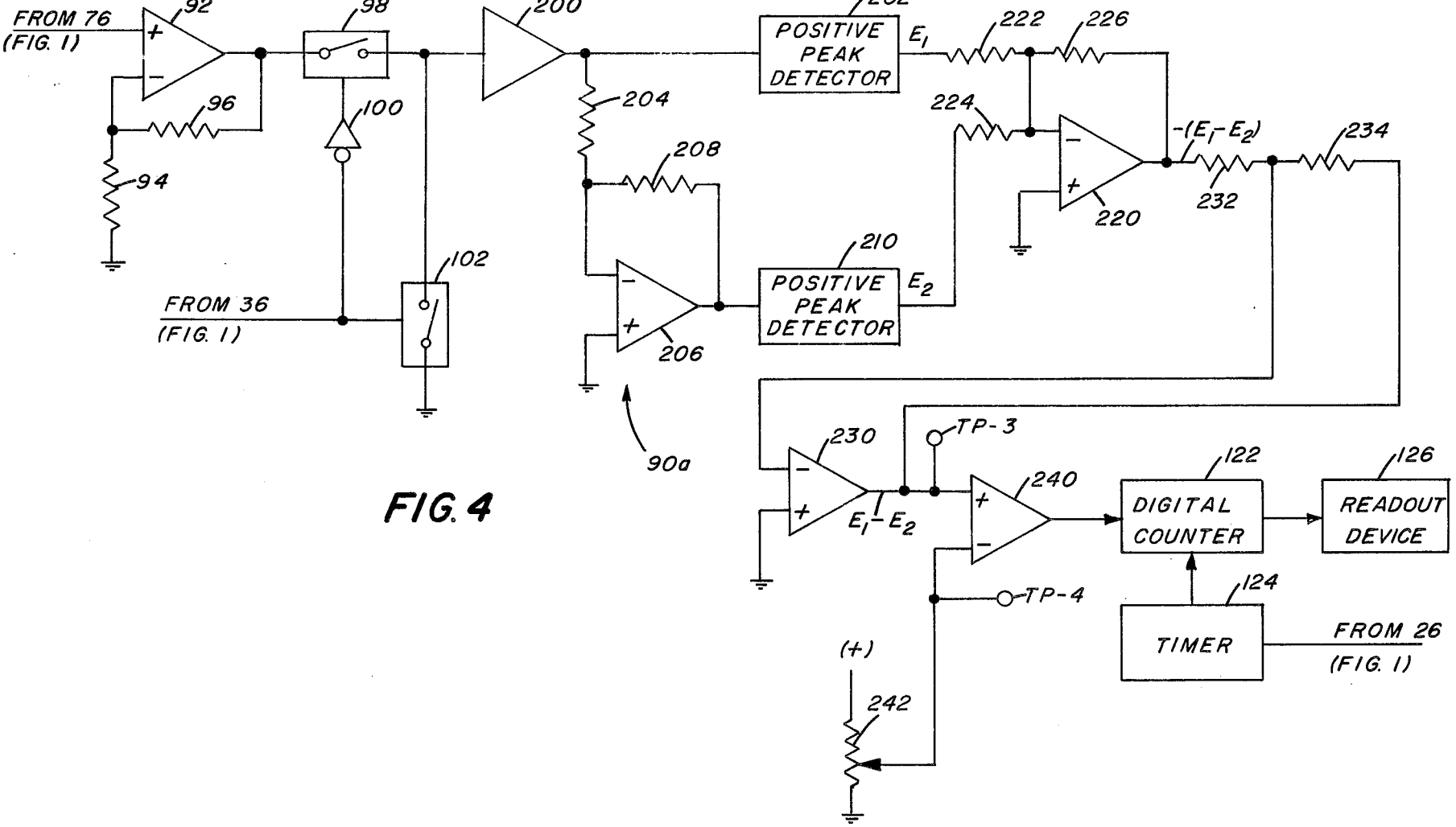

READOUT DEVICE
126
DIGITAL COUNTER
122
TIMER
124
FROM 36 (FIG. 1)
(+)
120
112
TP-2
114
(+)
TP-1
110
90
102
98
100
92
96
94
FROM 76 (FIG. 1)
FROM 36 (FIG. 1)

ΔV LIMIT
R+ΔV
R
COMPENSATION SIGNAL (KΔθ)
$t_0$
$t_1$
$t_2$
$t_0$
0
1000
2000
3000
4000
TIME — MICRO-SECONDS